United States Patent [19]
Caffey

[11] Patent Number: 6,099,008
[45] Date of Patent: Aug. 8, 2000

[54] HITCH FOR BICYCLE TRAILER

[75] Inventor: Stephen Patrick Caffey, Eugene, Oreg.

[73] Assignee: Burley Design Cooperative, Eugene, Oreg.

[21] Appl. No.: 09/144,737

[22] Filed: Sep. 1, 1998

[51] Int. Cl.[7] .................................................. B62K 27/00
[52] U.S. Cl. .......................... 280/204; 280/292; 280/503
[58] Field of Search .................................... 280/204, 292, 280/515, 503

[56] References Cited

U.S. PATENT DOCUMENTS

| | | | |
|---|---|---|---|
| Re. 26,806 | 3/1970 | Robinson . | |
| 3,387,859 | 6/1968 | McClellan . | |
| 3,567,249 | 3/1971 | Robinson . | |
| 3,762,748 | 10/1973 | Anders | 403/156 |
| 3,934,666 | 1/1976 | Ellington | 180/11 |
| 3,993,320 | 11/1976 | Robinson | 280/204 |
| 4,721,320 | 1/1988 | Creps et al. . | |
| 5,171,034 | 12/1992 | Scott | 280/204 |
| 5,267,744 | 12/1993 | Berry et al. | 280/204 |
| 5,516,131 | 5/1996 | Novotny . | |
| 5,713,698 | 2/1998 | Worsley | 405/60.5 |

*Primary Examiner*—Paul N. Dickson
*Assistant Examiner*—Tony Winner
*Attorney, Agent, or Firm*—Robert D. Varitz, PC

[57] ABSTRACT

A bicycle trailer hitch for joining a trailer, having a trailer tongue, to a bicycle, having a bicycle frame and a rear wheel, including a rear-wheel axle having an axis-of-rotation therethrough, mounted on a rear wheel mounting structure of the bicycle frame, includes a hitch mount secured to the rear axle of the bicycle, including a frame-contacting member mounted on the bicycle frame; and a hitch mount body rotatably mounted on said frame-contacting member; a hitch-mount retainer mechanism for securing said hitch mount to the bicycle frame; and a hitch connector fixed to the trailer tongue and removably receivable on said hitch mount body.

20 Claims, 4 Drawing Sheets

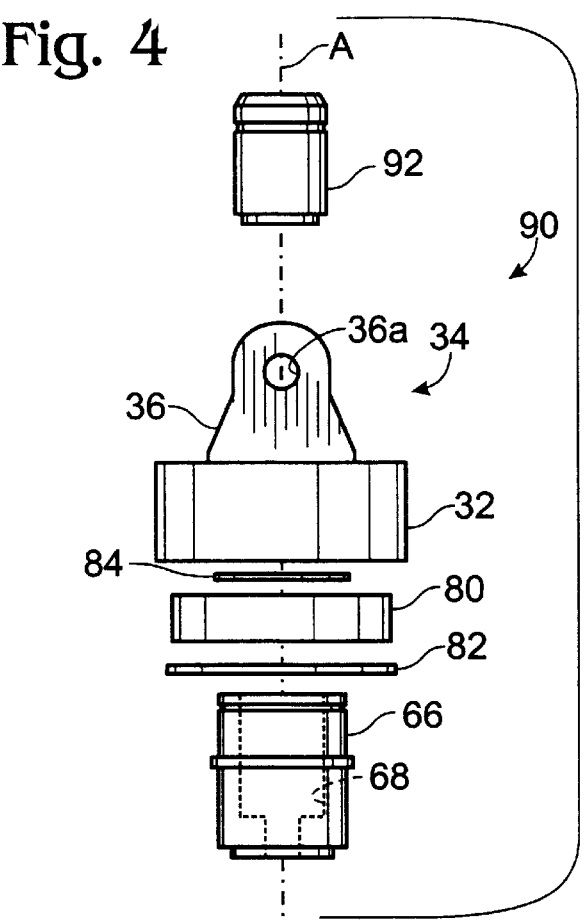
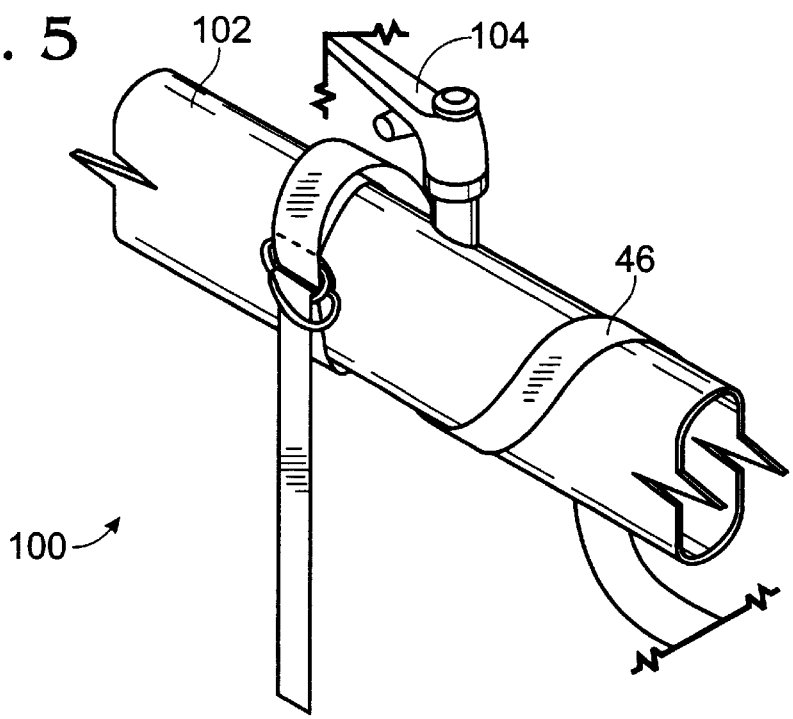

HITCH FOR BICYCLE TRAILER

SUMMARY OF THE INVENTION

The present invention relates to connections between bicycles and bicycle trailers, and specifically, to a bicycle trailer hitch which attaches to a bicycle's rear axle.

BACKGROUND OF THE INVENTION

Use of trailers with bicycles is increasing as cyclists discover that trailers provide ways of increasing the utility and capacity of their cycles. Bicycle trailers have been developed for various use, such as carrying children, shopping, and hauling laundry and other loads, and have been used behind touring cycles to expand load capacity beyond conventional bags and panniers.

There are various structures for connecting bicycle trailers to bicycles. Some connections attach to the bicycle seat post. These types of connections result in an attachment point above the center of gravity of the bicycle. This adversely affects the braking power of the bicycle, particularly as most bicycle trailers do not have independent braking.

Other known bicycle trailer hitches attach to the rear-most bicycle frame members, also known as stays, by means of clamps which are bolted or strapped to the frame and which encircle the stays. The clamps must withstand the stress as a result of trailer movement. Such stresses may cause the clamps to slide along the stays, thus working themselves loose. Sliding clamps also mar the finish of the bicycle. The clamps may be time-consuming to attach and remove and normally require the use of tools to attach and remove the clamps. Additionally, different clamp configurations may be required, as various sizes of stays are used on bicycles, some bicycle frames may have different sized stays used in their construction. Likewise, the angle between the stays may vary with different bicycle designs and sizes. Furthermore, on some bicycles, the stays are not co-planer, and thus require a stay-clamping hitch to be twisted for installation. Another trailer hitch is that disclosed in U.S. Pat. No. 4,721,320 to Creps et al., which teaches a clamping arrangement. While this clamp has been proven successful for towing trailers behind a bicycle, it is bulky, and does not fit all bicycles, especially those bicycles having mono-stays, and some bicycles with hub brakes.

Other types of connections are hitches that employ additional structures which attach to the rear axle of the bicycle, and thus become a modification of the bicycle. Such attachments may be extensions to the axles, which provide for the attachment of a trailer, such as that shown in U.S. Pat. No. 5,516,131 to Novotny.

In view of the aforementioned shortcomings in known bicycle trailer hitches, there is a need for a bicycle trailer hitch which fits the greatest possible number of bicycles, i.e., a nearly universal hitch, regardless of stay sizes and angles, provides heel clearance for large footed riders on bicycles having short chain stays, does not rely on clamps bolted to the stays, does not require modification of the bicycle, is easily installed and removed, may be transferred from one bicycle to another, and provides a safe, secure, and convenient mechanism for attaching a bicycle trailer to a bicycle.

SUMMARY OF THE INVENTION

A bicycle trailer hitch for joining a trailer, having a trailer tongue, to a bicycle, having a bicycle frame and a rear wheel, including a rear-wheel axle having an axis-of-rotation therethrough, mounted on a rear wheel mounting structure of the bicycle frame, includes a hitch mount secured to the rear axle of the bicycle, including a frame-contacting member mounted on the bicycle frame; and a hitch mount body rotatably mounted on said frame-contacting member; a hitch-mount retainer mechanism for securing the hitch mount to the bicycle frame; and a hitch connector fixed to the trailer tongue and removably receivable on the hitch mount body.

The trailer hitch of the invention overcomes the aforementioned shortcomings of known hitches.

It is an object of the invention to provide a trailer hitch which will fit nearly all bicycles, including those with rear suspensions, regardless of the size, shape or number of rear stays, stay angles, and the type of rear axle used on the bicycle.

Another object of the invention is to provide a trailer hitch which has heel clearance for riders on short chain stay bicycles.

Another object of the invention is to provide a trailer hitch which does not rely on clamps bolted to the frame stays.

Yet another object of the invention is to provide a trailer hitch that does not require modification of the bicycle.

A further object of the invention is to provide a trailer hitch which is easily installed and removed.

Still another object of the invention is to provide a trailer hitch with controlled rotation in the pitch and yaw axes.

Yet another object of the invention is to provide a trailer hitch may be easily transferred between similar bicycles.

Still another object of the invention is to provide a trailer hitch which is a safe, secure, and convenient mechanism for attaching a bicycle trailer to a bicycle.

Another object of the invention is to provide a trailer hitch which will fit all known drop-out configurations.

These and other objects and advantages of the invention will be more fully apparent as the description which follows is read in connection with the drawings.

BRIEF DESCRIPTION OF THE DRAWINGS

FIG. 4 is an exploded, top plan view of a second embodiment of the hitch of the invention.

FIG. 5 depicts the use of a safety strap on a bicycle frame having a mono-stay.

DETAILED DESCRIPTION OF THE PREFERRED EMBODIMENTS

Figure 1:
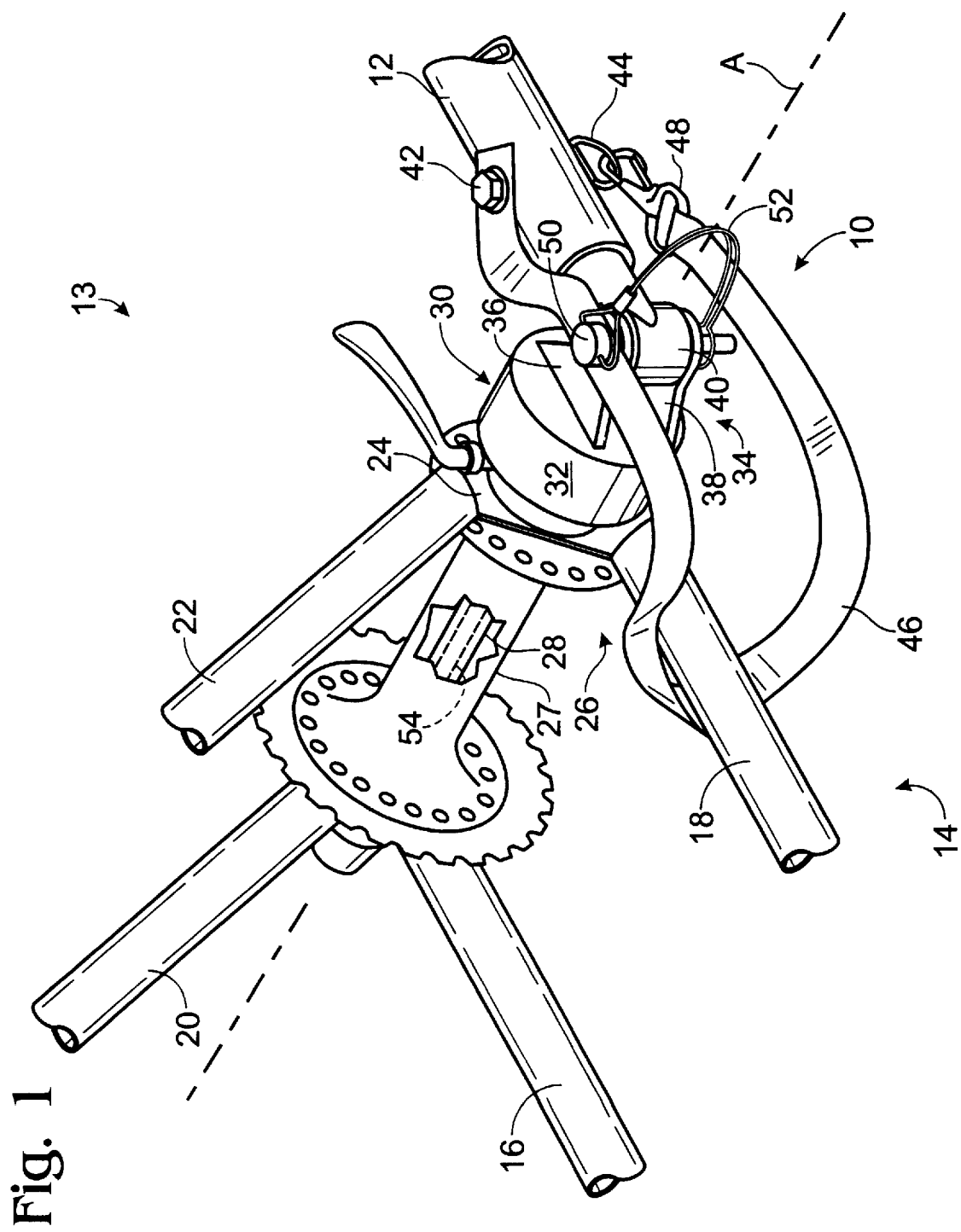
FIG. 1 depicts a bicycle trailer tongue connected to a bicycle using the trailer hitch of the invention.

Referring now to FIG. 1, the bicycle trailer hitch of the invention is depicted generally at 10. Hitch 10 is intended for use in joining a trailer (not shown) having a trailer tongue 12. The trailer which incorporates tongue 12 may be of the type shown in U.S. Pat. No. 5,020,814 to George et al., granted Jun. 4, 1991, or to the application of Derven et al., Ser. No. 08/932,940, filed Sep. 17, 1997, for folding bicycle trailer.

Bicycle 13 includes a frame, partially shown at 14, which has a pair of spaced apart horizontal chain stays 16, 18 and a pair of slanted, upwardly extending seat stays 20, 22. The stays are joined at the rear of the frame to a rear wheel mounting structure, or drop-out, 24, which mounts a rear wheel 26 to the frame. Rear wheel 26 includes a hub 27. A rear axle 28, having an axis of rotation, A, extends through hub 27. In the embodiment depicted in FIG. 1, rear axle 28 is of the quick-release type. In a quick-release hub, axle 28 includes a hollow tube extending through the hub and a skewer extending through the hollow portion of the axle to hold the wheel to the frame. In a non-quick-release hub, a solid axle extends through the hub, is bearing mounted therein, and extends beyond the edges of the hub through drop-outs 24.

Hitch 10 includes a hitch mount 30 secured to rear axle 28. Hitch mount 30 includes a hitch mount body 32, which is rotatable relative to frame 14 and which includes a hitch connector receiver 34 carried thereon. In the preferred embodiment, receiver 34 includes a pair of spaced-apart tabs 36, 38 which receive a hitch connector 40 therebetween. Each tab has a bore, 36a, 38a, respectively, formed therein. Hitch connector 40 includes a first bore 40a and a second bore 40b formed therein. Hitch connector 40 is received in trailer tongue 12 and secured therein by means of a fastener 42 which, in the preferred embodiment, takes the form of a nut-and-bolt combination, which passes through the trailer tongue and bore 40b. A D-ring 44 is provided, and secured to tongue 12 by means of fastener 42. Additionally, a safety strap 46 is secured at one end thereof to trailer tongue 12 by means of fastener 42. Strap 46 includes a snap fastener 48 at the other end thereof, which may be connected to D-ring 44. Additionally, a removable pin 50 is fixed to safety strap 46 and is used to secure hitch connector 40 to hitch connector receiver 34. Pin 50 is passed through bores 36a, 38a, and 40a to secure connector 40 to hitch connector receiver 34. Safety strap 46 is trainable about bicycle frame 14 to prevent separation of the trailer from the bicycle in the event that, for some unforeseen reason, any part of hitch 10 should come loose. It should be noted that in the preferred embodiment, pin 50 is equipped with a bail 52 which snaps into place to prevent accidental removal of pin 50 from hitch 10.

Figure 2:
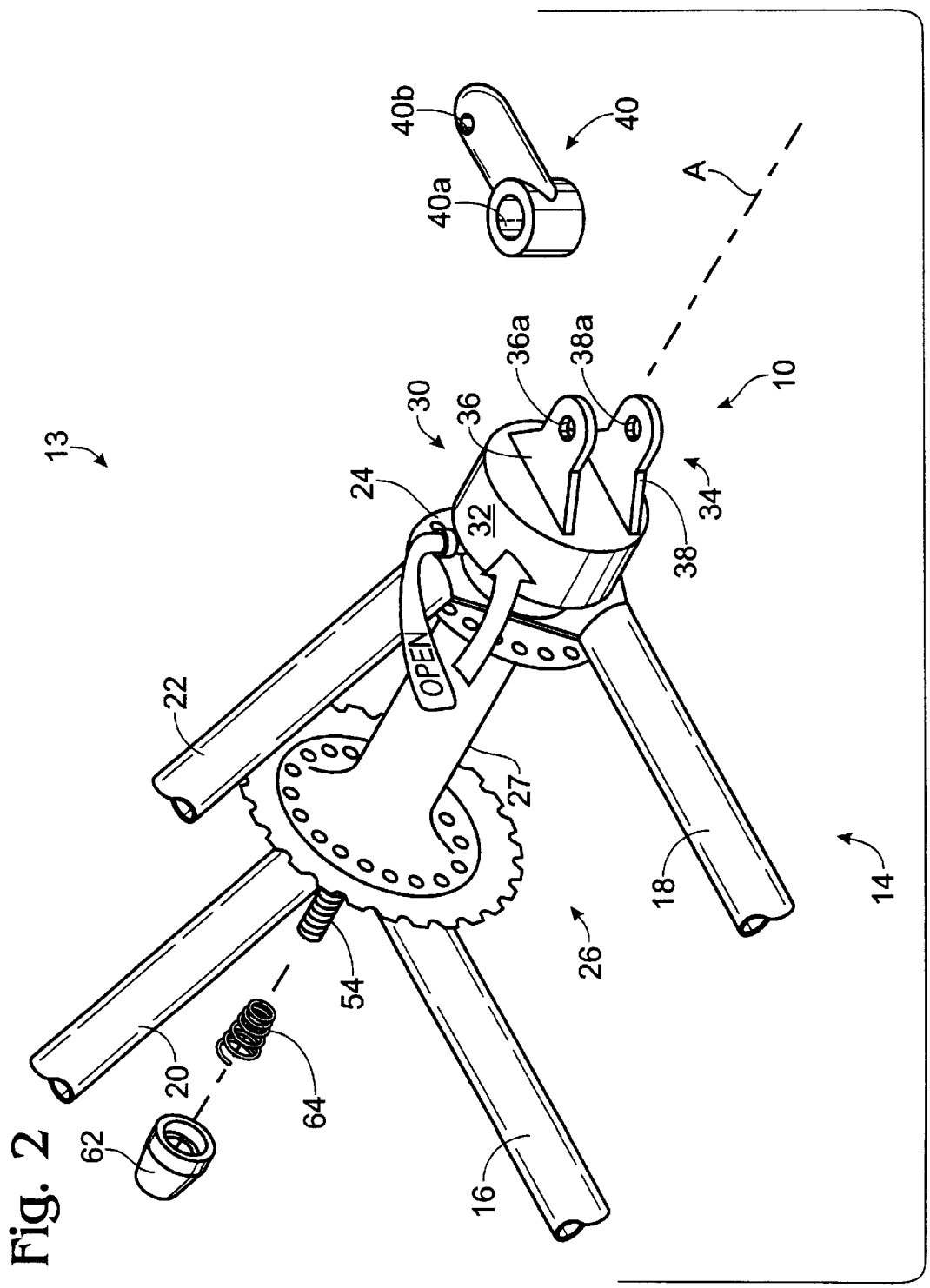
FIG. 2 is a perspective, partially exploded view of a first embodiment of the hitch of the invention.
Figure 3:
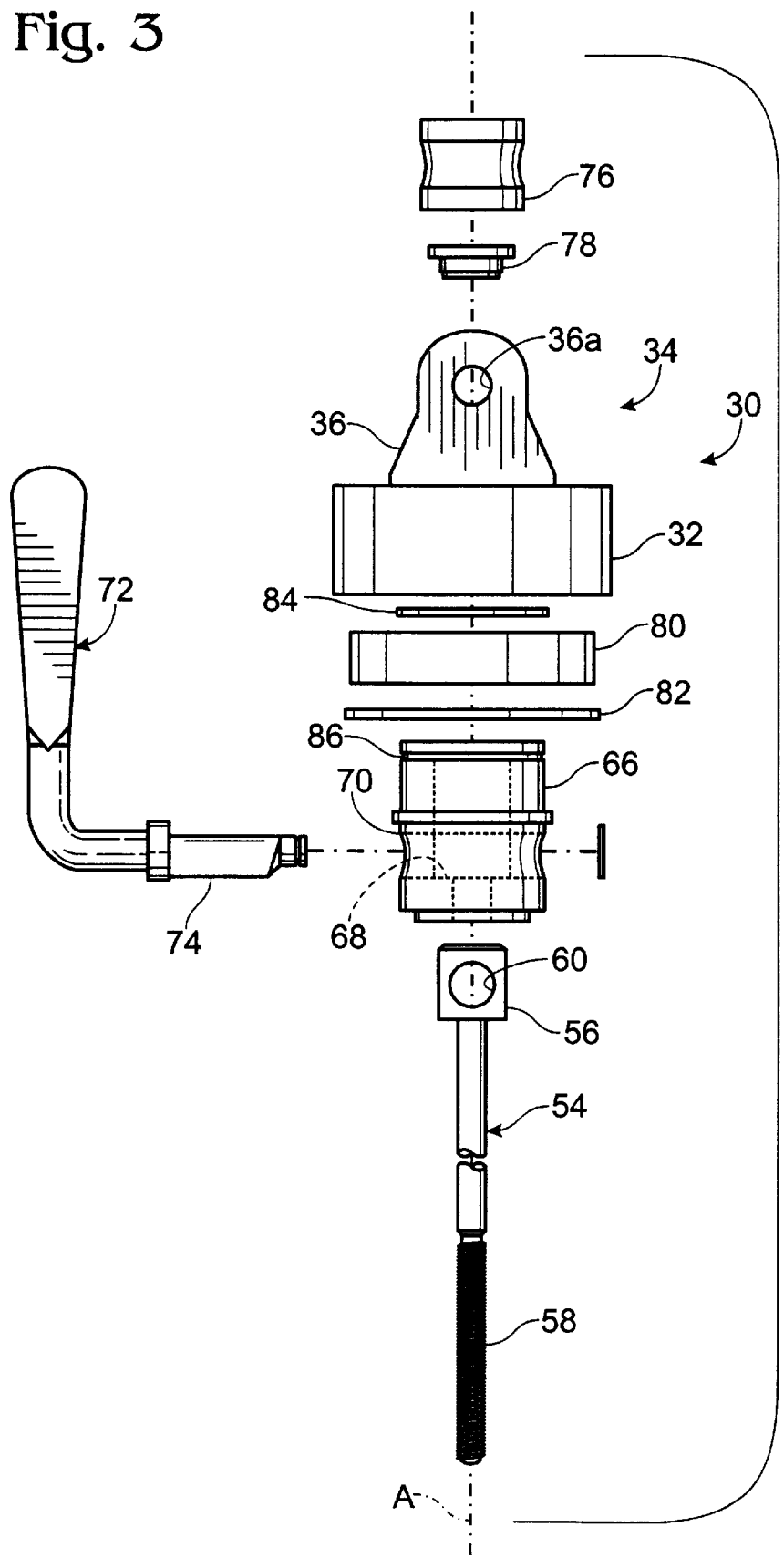
FIG. 3 is an exploded, top plan view of a first embodiment of the hitch of the invention.

Referring now to FIGS. 2 and 3, the first embodiment of the hitch mount and the hitch-mount retainer mechanism will be described in greater detail. The first embodiment of the hitch mount and hitch-mount retainer mechanism utilizes what is known as a quick-release mechanism. Such mechanism includes an elongate skewer 54 which extends through hub 27. Skewer 54 is slightly longer than a conventionally supplied quick-release skewer. Skewer 54 includes an enlarged head 56 at one end thereof and a threaded portion 58 at the other end thereof. A bore 60 extends through enlarged head 56 normal to the longitudinal axis of the skewer, which is collinear with axis of rotation A when the hitch mount is installed on bicycle 13. A nut 62 retains a spring 64 on the other end of skewer 54.

The enlarged head of skewer 54 is received in a frame-contacting member 66 of hitch mount 30. Frame-contacting member 66 is mounted on bicycle frame 14 in contact with rear wheel mounting structure 24. Frame-contacting member 66 includes a cavity 68 therein which is constructed and arranged to receive head 56 of skewer 54 in a clearance fit. A bore 70 extends therethrough and is arranged to be normal to axis of rotation A. Bore 70 and bore 60 receive a tensioning handle 72, which has an eccentric portion 74 which, when properly adjusted with nut 62, applies an axle-fixing tension to skewer 54, thereby holding skewer 54 and, in turn, holding hub 27 and axle 28 in place on frame 14.

As is shown in FIG. 3, the components of hitch mount 30 fit together within hitch mount body 32. Skewer 54 passes through a sleeve 76 and a guide 78 inside cavity 68. A bearing 80 is located between hitch mount body 32 and frame-contacting member 66 for providing relative rotation therebetween. Bearing 80 is held in place within hitch mount body 32 by a clip 82, which is received in a groove in hitch mount body 32. A second clip 84 is installed on the detent 86 of frame-contacting member 66 to hold the entire structure together.

Referring now to FIGS. 1 and 2, it may be seen that hitch connector receiver 34 is constructed and arranged to allow yaw-only movement of hitch connector 40 relative thereto. As hitch mount body 32 may rotate relative to frame 14, movement of hitch connector 40 relative to the frame may take place in only two axes: yaw and pitch. In the preferred embodiment, the arrangement allows only limited roll movement due to the flexion of the hitch connector, enabling limited tipping of the bicycle relative to a two-wheel trailer.

Turning now to FIG. 4, the embodiment of the bicycle trailer hitch depicted at 90 is intended for use on a bicycle that does not have the quick-release rear wheel mounting, and has a solid or threaded axle extending through the hub of the real wheel. In this case, the components are substantially similar to that of the first embodiment, and where appropriate, are identified by like reference numbers. The difference is the use of a barrel nut 92, or threaded fastener, as a retainer mechanism, which is secured to the threaded axle of the rear wheel, thereby holding the trailer hitch in place on the bicycle. Barrel nut 92 passes through hitch mount body 32 and is received in cavity 68 of frame contacting member 66.

In order to install the trailer hitch of the invention on a bicycle, it may first be necessary to install connector 40 in the trailer tongue, if the trailer tongue does not already have an appropriate connector. This is done by removing any original connector and inserting the connector of the invention, securing same thereto with fastener 42. In order to install the bicycle side of the hitch, it is necessary to remove the original quick-release mechanism from the rear wheel of the bicycle. The hitch mount is installed by replacing the original quick-release mechanism with skewer 54 (and its associated nut 62 and spring 64), and inserting skewer 54 with the attached hitch mount body and the frame-contacting member, placing the frame-contacting member in contact with the rear-wheel mounting structure with the skewer extending through the rear axle. It should be noted that this placement takes place on the side of the rear wheel opposite the drive side. A single spring 64 and nut 62 are installed on the drive-side of the rear wheel. Nut 62 and tensioning handle 72 are adjusted until the rear wheel and the hitch mount are properly installed and secured to bicycle 13. At this point, hitch connector 40 may be positioned between tabs 36, 38, and pin 50 may be installed. Safety strap 46 is then trained about the horizontal stay, as indicated in FIG. 1, and snap fastener 48 secured to D-ring 44.

In the event that the second embodiment of the hitch is being installed, the retaining nut on the non-drive side of the rear wheel is simply removed, the hitch mount is inserted over the axle, and barrel nut 92 is installed and properly tightened.

Referring now to FIG. 5, when the hitch is used on a bicycle 100 having a mono-stay system 102, safety strap 46 must be trained about the mono-stay so as to be retained by a cantilever brake stud 104, or other structure which protrudes from the mono-stay, so that the strap will not slip off of the mono-stay if the rear wheel comes loose, nor become wrapped about the rear axle.

Although a preferred embodiment of the invention, and an alternate design thereof, have been disclosed, it will be appreciated that further variations and modifications may be made thereto without departing from the scope of the invention as defined in the appended claims.

I claim:

1. A bicycle trailer hitch, in combination with a bicycle having a bicycle frame and a rear wheel, including a rear-wheel axle having an axis-of-rotation therethrough, mounted on a rear wheel mounting structure of the bicycle frame and a trailer having a trailer tongue, for joining the trailer to the bicycle, comprising:
   a hitch mount secured to the rear axle of the bicycle co-axially with the rear axle; including:
      a frame-contacting member mounted on the bicycle frame co-axially with the rear axle; and
      a hitch mount body rotatably mounted on said frame-contacting member;
   a hitch-mount retainer mechanism for securing said hitch mount to the bicycle frame; and
   a hitch connector fixed to the trailer tongue and removably receivable on said hitch mount body.

2. The bicycle trailer hitch of claim 1 wherein said hitch-mount retainer mechanism includes an elongate, quick-release skewer extending through the rear axle, said skewer having an enlarged head at one end thereof wherein said enlarged head has a bore extending therethrough normal to the longitudinal axis of said skewer; a tensioning handle having an eccentric portion for applying axle-fixing tension to said skewer; wherein said frame-contacting member includes a cavity therein which is constructed and arranged to receive said head of said skewer clearance fittably therein, and a bore therethrough normal to the axis of rotation for receiving said tensioning handle.

3. The bicycle trailer hitch of claim 1 wherein said frame-contacting member includes a first cavity therein; said hitch mount body includes a second cavity therein; and said hitch-mount retainer mechanism includes a threaded fastener rotatably received in said second cavity and fixedly received in said first cavity, and which is secured to the rear axle.

4. The bicycle trailer hitch of claim 1 which includes a bearing located between said frame-contacting member and said hitch mount body for providing relative rotation therebetween.

5. The bicycle trailer hitch of claim 1 wherein said hitch mount body includes a hitch-connector receiver thereon for receiving said hitch connector.

6. The bicycle trailer hitch of claim 5 wherein said hitch connector receiver is constructed and arranged to allow yaw-only movement of said hitch connector relative thereto.

7. The bicycle trailer hitch of claim 5 wherein said hitch connector receiver includes a pair of spaced-apart tabs extending along the axis of rotation outwardly from said hitch mount body, wherein each of said tabs has a bore therethrough normal to the axis of rotation; wherein said hitch connector includes a received portion, having a bore therethrough, which is clearance fittable between said tabs; and which further includes a pin for removable insertion through said bores in said tabs and through said bore in said received portion for joining the trailer to the bicycle.

8. The bicycle trailer of claim 1 which includes a safety strap fixed to the trailer tongue, the hitch connector, and which is trainable about the bicycle frame to prevent separation of the trailer from the bicycle.

9. A bicycle trailer hitch, in combination with a bicycle having a bicycle frame and a rear wheel, including a rear-wheel axle having an axis-of-rotation therethrough, mounted on a rear wheel mounting structure of the bicycle frame and a trailer having a trailer tongue, for joining the trailer to the bicycle, comprising:
   a hitch mount removably secured to the rear axle of the bicycle co-axially with the rear axle, including:
      a frame-contacting member mounted on the bicycle frame co-axially with the rear axle; and
      a hitch mount body rotatably mounted on said frame-contacting member co-axially with the rear axle, which includes a hitch-connector receiver thereon;
   a hitch-mount retainer mechanism for securing said hitch mount to the bicycle frame; and
   a hitch connector fixed to the trailer tongue and removably receivable in said hitch-connector receiver, wherein said hitch-connector receiver is constructed and arranged to allow two-axis only movement of hitch connector relative bicycle frame.

10. The bicycle trailer hitch of claim 9 wherein said hitch-mount retainer mechanism includes an elongate, quick-release skewer extending through the rear axle, said skewer having an enlarged head at one end thereof wherein said enlarged head has a bore extending therethrough normal to the longitudinal axis of said skewer; a tensioning handle having an eccentric portion for applying axle-fixing tension to said skewer; wherein said frame-contacting member includes a cavity therein which is constructed and arranged to receive said head of said skewer clearance fittably therein, and a bore therethrough normal to the axis of rotation for receiving said tensioning handle.

11. The bicycle trailer hitch of claim 9 wherein said frame-contacting member includes a first cavity therein; said hitch mount body includes a second cavity therein; and said hitch-mount retainer mechanism includes a threaded fastener rotatably received in said second cavity and fixedly received in said first cavity, and which is secured to the rear axle.

12. The bicycle trailer hitch of claim 9 which includes a bearing located between said frame-contacting member and said hitch mount body for providing relative rotation therebetween.

13. The bicycle trailer hitch of claim 9 wherein said hitch connector receiver is constructed and arranged to allow yaw-only movement of said hitch connector relative thereto.

14. The bicycle trailer hitch of claim 9 wherein said hitch connector receiver includes a pair of spaced-apart tabs extending along the axis of rotation outwardly from said hitch mount body, wherein each of said tabs has a bore therethrough normal to the axis of rotation; wherein said hitch connector includes a received portion, having a bore therethrough, which is clearance fittable between said tabs; and which further includes a pin for removable insertion through said bores in said tabs and through said bore in said received portion for joining the trailer to the bicycle.

15. The bicycle trailer of claim 9 which includes a safety strap fixed to the trailer tongue, the hitch connector, and which is trainable about the bicycle frame to prevent separation of the trailer from the bicycle.

16. A bicycle trailer hitch, in combination with a bicycle having a bicycle frame and a rear wheel, including a rear-wheel axle having an axis-of-rotation therethrough, mounted on a rear wheel mounting structure of the bicycle frame and a trailer having a trailer tongue, for joining the trailer to the bicycle, comprising:
   a hitch mount removably secured to the rear axle of the bicycle, including:
      a frame-contacting member non-rotatably mounted on the bicycle frame co-axially with the rear axle; and a hitch mount body rotatably mounted on said frame-contacting member co-axially with the rear axle, which includes a hitch-connector receiver thereon, wherein said hitch connector receiver includes a pair of spaced-apart tabs extending along the axis of rotation outwardly from said hitch mount body, wherein each of said tabs has a bore therethrough normal to the axis of rotation;

a hitch-mount retainer mechanism for removable securing said hitch mount to the rear axle; and a hitch connector fixed to the trailer tongue and removably receivable in said hitch-connector receiver, wherein said hitch-connector receiver is constructed and arranged to allow two-axis only movement of hitch connector relative bicycle frame, and wherein said hitch connector includes a received portion, having a bore therethrough, which is clearance fittable between said tabs; and which further includes a pin for removable insertion through said bores in said tabs and through said bore in said received portion for joining the trailer to the bicycle.

17. The bicycle trailer hitch of claim 16 wherein said hitch-mount retainer mechanism includes an elongate, quick-release skewer extending through the rear axle, said skewer having an enlarged head at one end thereof wherein said enlarged head has a bore extending therethrough normal to the longitudinal axis of said skewer; a tensioning handle having an eccentric portion for applying axle-fixing tension to said skewer; wherein said frame-contacting member includes a cavity therein which is constructed and arranged to receive said head of said skewer clearance fittably therein, and a bore therethrough normal to the axis of rotation for receiving said tensioning handle.

18. The bicycle trailer hitch of claim 16 wherein said frame-contacting member includes a first cavity therein; said hitch mount body includes a second cavity therein; and said hitch-mount retainer mechanism includes a threaded fastener rotatably received in said second cavity and fixedly received in said first cavity, and which is secured to the rear axle.

19. The bicycle trailer hitch of claim 16 which includes a bearing located between said frame-contacting member and said hitch mount body for providing relative rotation therebetween.

20. The bicycle trailer of claim 16 which includes a safety strap fixed to the trailer tongue, the hitch connector, and which is trainable about the bicycle frame to prevent separation of the trailer from the bicycle.

* * * * *